(12) United States Patent
Casey et al.

(10) Patent No.: US 12,224,915 B2
(45) Date of Patent: Feb. 11, 2025

(54) AI-SUPPORTED NETWORK TECHNIQUES

(71) Applicant: Level 3 Communications, LLC, Broomfield, CO (US)

(72) Inventors: Steven M. Casey, Littleton, CO (US); William R. Henning, Prairieville, LA (US); Stephen Opferman, Denver, CO (US); Todd A Borchert, Parker, CO (US); Rahul Chowdhury, Denver, CO (US)

(73) Assignee: Level 3 Communications, LLC, Denver, CO (US)

( * ) Notice: Subject to any disclaimer, the term of this patent is extended or adjusted under 35 U.S.C. 154(b) by 1 day.

(21) Appl. No.: 17/477,667

(22) Filed: Sep. 17, 2021

(65) Prior Publication Data
US 2022/0094606 A1 Mar. 24, 2022

Related U.S. Application Data

(60) Provisional application No. 63/082,575, filed on Sep. 24, 2020.

(51) Int. Cl.
*H04L 41/16* (2022.01)
*H04L 41/0631* (2022.01)
*H04L 43/04* (2022.01)

(52) U.S. Cl.
CPC .......... *H04L 41/16* (2013.01); *H04L 41/0631* (2013.01); *H04L 43/04* (2013.01)

(58) Field of Classification Search
CPC ..... H04L 41/16; H04L 41/0631; H04L 43/04; H04L 41/069; H04L 41/0213; H04L 41/142; H04L 41/145
See application file for complete search history.

(56) References Cited

U.S. PATENT DOCUMENTS 10,601,640 B1 * 3/2020 Das .................. H04L 41/147
10,679,133 B1 * 6/2020 Mathur ................ G06N 5/025
(Continued)

OTHER PUBLICATIONS

S. Agarwal, V. Aggarwal, A. R. Akula, G. B. Dasgupta and G. Sridhara, "Automatic problem extraction and analysis from unstructured text in IT tickets," in IBM Journal of Research and Development, vol. 61, No. 1, p. 4:41-4:52, Jan. 1-Feb. 2017. (Year: 2017).*

(Continued)

*Primary Examiner* — Patrice L Winder

(57) ABSTRACT

Examples of the present disclosure relate to an AI-supported CDN. In examples, a data processing engine processes log data of a CDN node according to a model to identify an issue. An issue indication is provided to a solution generation engine, which generates a set of solutions to automatically resolve the issue. The set of solutions is provided to a solution implementation engine, which iteratively implements solutions to resolve the issue using solution implementation information associated with a given solution. Thus, the data processing engine need not have knowledge regarding the specific hardware and/or software used within the CDN. Similarly, the solution generation engine need not have knowledge of the structure of the CDN and/or configuration of devices associated with the identified issue, such that the solution implementation engine provides a layer of abstraction between a solution and the implementation-specific details used to implement the solution within the CDN.

19 Claims, 6 Drawing Sheets

(56) References Cited

U.S. PATENT DOCUMENTS

| | | | |
|---|---|---|---|
| 2009/0063387 A1* | 3/2009 | Beaty | G06N 5/04 |
| | | | 706/50 |
| 2011/0055699 A1* | 3/2011 | Li | G06F 16/951 |
| | | | 707/E17.014 |
| 2015/0280969 A1* | 10/2015 | Gates | H04L 41/0631 |
| | | | 714/37 |
| 2017/0134237 A1* | 5/2017 | Yang | H04L 41/12 |
| 2018/0019910 A1* | 1/2018 | Tsagkaris | H04W 28/18 |
| 2019/0014023 A1* | 1/2019 | Gupta | G06F 9/45533 |
| 2019/0130310 A1* | 5/2019 | Madhava Rao | G06N 5/022 |
| 2020/0241953 A1* | 7/2020 | Ali | G06F 11/0787 |
| 2020/0334556 A1* | 10/2020 | Lele | G06N 5/022 |
| 2020/0387809 A1* | 12/2020 | Banerjee | G06N 20/00 |
| 2021/0021494 A1* | 1/2021 | Yao | H04L 41/5009 |
| 2021/0176530 A1* | 6/2021 | Lobanov | H04N 21/6582 |
| 2022/0019935 A1* | 1/2022 | Ghatage | G06F 11/302 |
| 2022/0114041 A1* | 4/2022 | Tiwari | H04L 41/16 |

OTHER PUBLICATIONS

E. Aumayr, M. Wang and A.-M. Bosneag, "Probabilistic Knowledge-Graph based Workflow Recommender for Network Management Automation," 2019 IEEE 20th International Symposium on "A World of Wireless, Mobile and Multimedia Networks" (WoWMoM), Washington, DC, USA, 2019, pp. 1-7. (Year: 2019).*

* cited by examiner

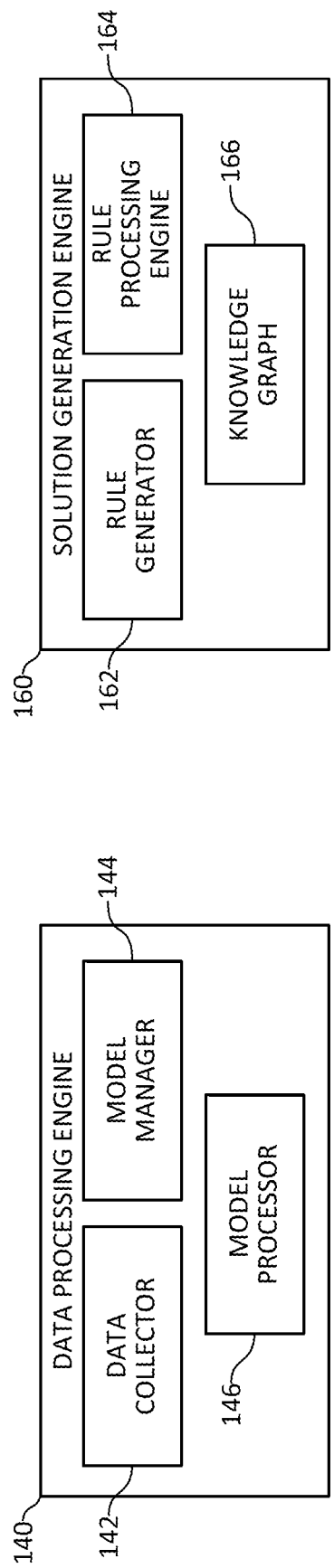
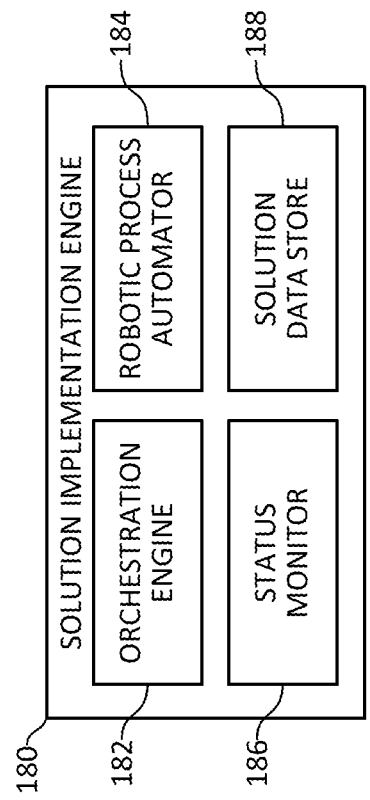
FIG. 1C
FIG. 1B
FIG. 1D

AI-SUPPORTED NETWORK TECHNIQUES

CROSS-REFERENCE TO RELATED APPLICATIONS

This application claims the benefit of U.S. Provisional Application No. 63/082,575 filed 24 Sep. 2020, entitled "AI-Supported Network Techniques," which is incorporated herein by reference in its entirety.

BACKGROUND

A content distribution network (CDN) comprises one or more nodes and associated edge servers. However, identifying issues and subsequently repairing such issues within the CDN may be difficult, especially as the number of servers and other computing devices increases.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to using artificial intelligence (AI) and associated machine learning techniques within a content distribution network (CDN) to provide an AI-supported network. In examples, log data of a CDN node is processed by a data processing engine according to one or more models in order to identify the existence of an issue. An indication of the identified issue is provided to a solution generation engine, which generates a set of solutions to automatically resolve the identified issue. In examples, the solution generation engine may be a specialized solution generation engine that is trained to generate solutions for a specific software package, hardware device, or vendor, among other examples.

The set of solutions is provided to a solution implementation engine, which iteratively implements solutions from the set of solutions in order to resolve the identified issue. The solution implementation engine may identify solution implementation information associated with a given solution in order to implement the solution within the CDN. Thus, the data processing engine need not have knowledge regarding the specific hardware and/or software used within the CDN. Similarly, the solution generation engine need not have knowledge of the structure of the CDN and/or configuration of devices associated with the identified issue, such that the solution implementation engine provides a layer of abstraction between a solution and associated implementation-specific details that are used to implement the solution within the CDN.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1B illustrates an overview of an example data processing engine.

FIG. 1C illustrates an overview of an example solution generation engine.

FIG. 1D illustrates an overview of an example solution implementation engine.

DETAILED DESCRIPTION

Figure 1A:
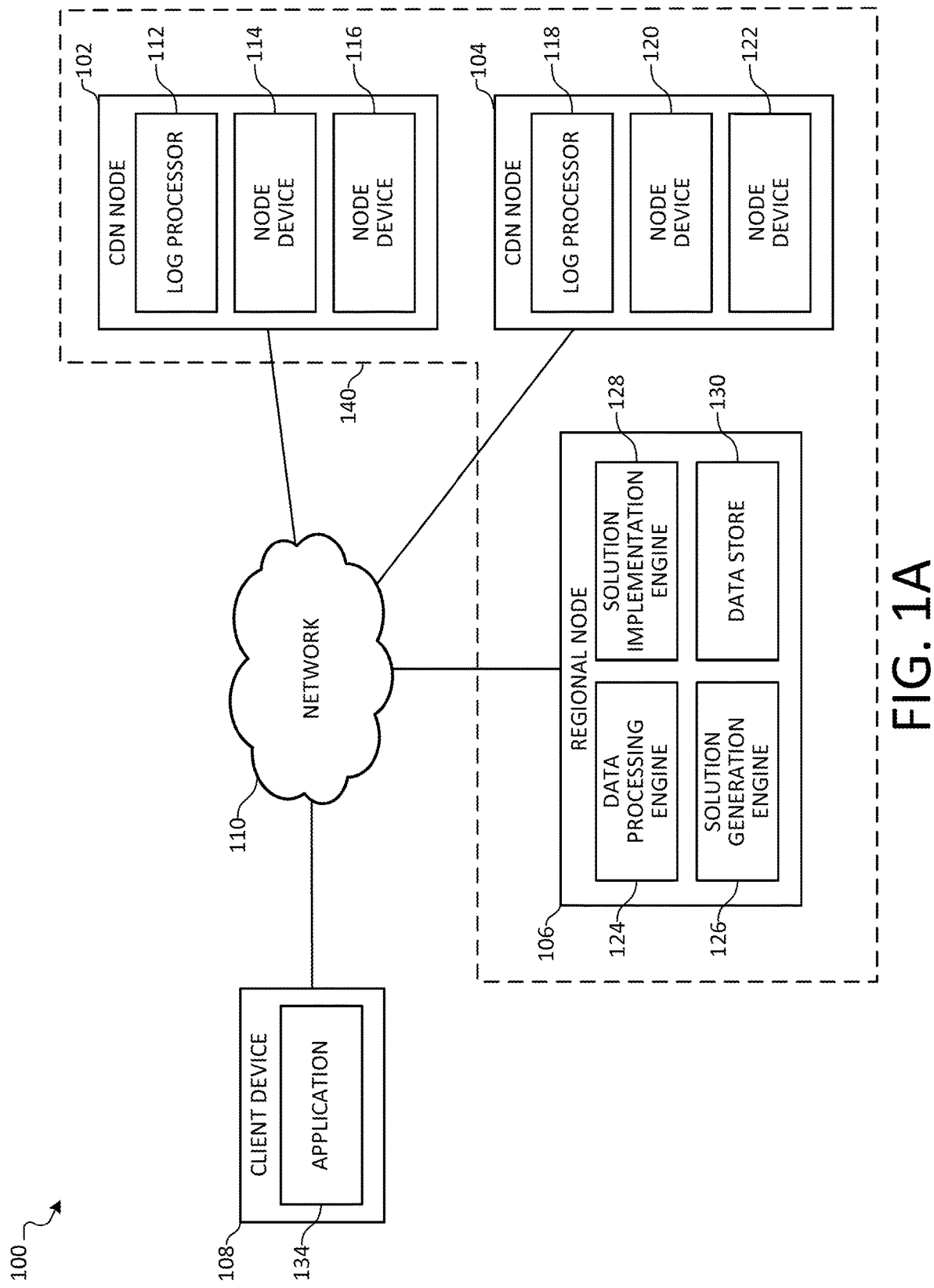
FIG. 1A illustrates an overview of an example system in which aspects of an AI-supported network are performed.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A content distribution network (CDN) comprises a set of edge servers used to process requests from client computing devices. In examples, edge servers of the CDN are grouped to form a node within the CDN. Log data generated by edge servers and/or other computing devices within a node (also referred to herein as "node devices") may be used to identify an issue within the CDN. The issue may be investigated by a support team, after which an operations team may further investigate the issue and subsequently implement a solution. However, such an issue resolution model relies on cross-team communication, team members having specialized knowledge of computing devices and/or the structure of the CDN, and having a sufficient number of skilled team members to identify and resolve issues in a timely manner. As a result, such a model may not scale well (e.g., as additional devices are added to the CDN, as demand for CDN resources increases, etc.).

Accordingly, aspects of the present disclosure relate to using artificial intelligence (AI) and associated machine learning techniques within a CDN to provide an AI-supported network. In examples, log data is processed by a data processing engine according to one or more models to identify an issue. Example issues include, but are not limited to, a performance bottleneck, a hardware or software failure, a hardware or software misconfiguration, or CDN content delivery issues (e.g., cache fill issues, cache delivery issues, etc.), among other examples. The identified issue is processed to generate a set of potential solutions to resolve a cause of the identified issue. In some examples, a solution generation engine is used to generate the set of solutions. The solution generation engine may be selected based at least in part on software or hardware associated with the identified issue. For example, a solution generation engine may be vendor-specific, hardware-specific, and/or software-specific, such that the data processing engine need not have knowledge regarding the specific hardware and/or software used within the CDN.

The generated set of solutions may then be implemented to automatically resolve the identified issue. For example, a solution implementation engine may iteratively implement each solution of the set of solutions. In examples, the solution implementation engine identifies solution implementation information comprising a set of actions (e.g., application programming interface (API) calls, actions performed via a robotic process automation (RPA) system, changes to orchestrate within the CDN, one or more devices with which to interact, etc.) associated with a solution, such that the solution implementation engine provides a layer of abstraction between a solution and associated implementation-specific details that are used to implement the solution. Thus, the solution generation engine need not have knowledge of the structure of the CDN and/or configuration of devices associated with the identified issue, among other examples.

In examples, a CDN is used by a service (e.g., a customer of the CDN) to process requests of client computing devices associated with users of the service. Any of a variety of services may use a CDN according to aspects described herein. Example services include, but are not limited to, a video streaming service, a video game service, a cloud-computing service, or a web application service. For example, a video streaming service may use the CDN to provide streaming content, thereby offloading at least a part of the computational demand associated with providing the video streaming service to the CDN. As another example, the video game service may use the CDN to distribute game updates and/or perform server-side processing, among other examples. Thus, it will be appreciated that a service may use a CDN for any of a variety of computing functionality, including, but not limited to, providing content (e.g., one or more files, video and/or audio streams, etc.), server-side processing (e.g., online gaming, cloud computing, web applications, etc.), and audio/video conferencing, among other examples.

As used herein, log data includes, but is not limited to, information relating to system performance (e.g., resource utilization, requests per second, etc.), system errors (e.g., hardware failures, software stack traces, request timeouts, etc.), CDN cache performance (e.g., hit ratio, miss ratio, etc.), and/or requests from client computing devices (e.g., a requested resource, a device type, a source Internet Protocol (IP) address, an associated service, etc.). Thus, it will be appreciated that log data may relate to key performance indicators, metrics, telemetry, fault information, and/or performance information. In examples, at least a part of the log data for the node is generated by one or more edge servers and/or networking devices (e.g., a router, a switch, a firewall device, a load balancer, etc.). Log data may be received in the form of NetFlow data, syslog messages, simple network management protocol (SNMP) messages, and/or alarms, among other examples. It will be appreciated that while examples described herein are discussed with respect to log data generated by devices of a CDN, other examples may use external log data generated from a variety of other sources, such as from a client computing device or by a service that is a customer of the CDN. In such examples, the external log data may be correlated with CDN log data to enhance the feature set processed by models according to aspects described herein.

Any of a variety of models may be used to analyze log data, including, but not limited to, a machine learning model or a statistical model. For example, log data may be processed to generate a statistical model that may then be used to evaluate subsequent log data and/or perform forecasting based on collected log data. The statistical model may identify one or more thresholds or ranges that are indicative of normal or routine behavior (e.g., relating to resource utilization, requests per second, cache performance, time to process a request, etc.), such that subsequent log data or a forecast that exceeds such a threshold or range is classified as an issue accordingly. As another example, a machine learning model may be generated using annotated log data, thereby enabling the subsequent forecasting or classification of log data based on the machine learning model. It will be appreciated that example machine learning techniques are described herein and that any of a variety of supervised and unsupervised machine learning techniques may be used, including, but not limited to, neural networks, deep learning, and/or generative adversarial networks.

In some examples, multiple models are used to analyze the log data. For example, results from a set of models are compared to identify which model has the highest confidence. In some instances, model performance is tracked over time, thereby enabling multiple models to be ranked according to one or more model performance metrics (e.g., prediction accuracy, average confidence score, etc.). Further, a model may be associated with specific hardware, software, a service, a vendor, computing functionality of the CDN, or other instances in which the model should be used to process log data. Thus, the model need not be used to process log data in all instances, but may instead be associated with one or more specific instances in which the model is well-suited to process such log data. Additionally, historical log data that is used to train or otherwise generate a model may be selectively retained, where log data that is determined to be associated with routine or expected behavior within the CDN may be periodically sampled, averaged, or summarized, such that the entire set of data is not retained. By contrast, log data that is determined to be indicative of an issue or other anomalous behavior may be retained, thereby yielding a training data set with a higher percentage of anomalous training data. Such techniques may reduce the storage requirements associated with training log data and may also improve model performance.

As an example, log data associated with an identified issue may be stored for later use when an issue is identified. In such examples, an indication of the identified issue is stored with the associated log data. Such stored log data may be used to train a new model or update an existing model in order to improve the accuracy of the model. Thus, it will be appreciated that a model may be updated over time, for example in order to be responsive to changes in CDN behavior, network conditions, equipment changes, and/or capacity changes. As an example, a model may be updated if there is a high frequency of failures of log events, or according to one or more patterns (e.g., daily or weekly trends, seasonal demand, etc.). Any of a variety of model performance metrics (e.g., model confidence, deviation from past performance, etc.) may also be evaluated and used to determine whether to retrain a model, such that a model performance metric below a predetermined threshold or outside of a predetermined range may cause a model to be retrained or updated. In other examples, the model may be replaced with a different model, for example a model that is better-performing according to one or more performance metrics, that was recently generated, or was recently retrained. It will be appreciated that any of a variety of reinforcement learning techniques may be used in instances where a machine learning model is used.

An issue identified by a model may be processed by a solution generation engine to identify a cause and an associated set of solutions. The solution generation engine may receive an indication of the issue from a data processing engine or may listen for issues on a message bus or a chat channel (e.g., KAFKA topics, SLACK channels, etc.), among other communication techniques. As an example, the solution generation engine listens for issues associated with a software package, a hardware device, a vendor, or computing functionality provided by the CDN, among other examples, for which the solution generation engine is suited to generate a set of solutions accordingly. As another example, the solution generation engine may subscribe to a specific chat channel, such as, for example, a chat channel associated with CISCO hardware devices. Thus, it will be appreciated that a solution generation engine may be specialized or, in other instances, the solution generation engine may be generic or may be associated with multiple software packages, vendors, and/or hardware devices, etc. In instances where the data processing engine provides an indication of an issue to a solution generation engine, the data processing engine may select the solution generation engine from a set of available solution generation engines based at least in part on the hardware, software, vendor, and/or computing functionality associated with the issue.

A solution generation engine may be trained using any of a variety of sources, including, but not limited to, a manual, a knowledgebase article, a trouble ticket, or any of a variety of other data sources. Example training data used to train a solution generation engine includes, but is not limited to, a set of causes and a set of associated solutions. Each cause may have one or more associated issues that are indicative of a given cause. Thus, as used herein, an issue may be a "symptom" of a cause, such that a solution associated with a cause may resolve the identified issue. The solution generation engine is trained to identify causes associated with a given issue (e.g., as may be generated by a data processing engine), such that a set of associated solutions may be determined. In some examples, reinforcement learning may be used to generate new solutions or prioritize existing solutions based at least in part on observed effectiveness. For example, log data may indicate that a certain solution of a set of solutions was effective in resolving an issue for which a cause and an associated set of solutions was identified. Such data may be used when training the solution generation engine, thereby prioritizing solutions that have previously been tried and/or identified to be effective.

In some examples, a solution generation engine uses a knowledge graph to generate a set of solutions. As an example, the knowledge graph comprises a set of nodes and a set of edges. For example, a cause node may define a cause and may be associated with one or more solution nodes via an edge. An edge within the knowledge graph may have one or more rules via which a cause node and a solution node are associated. For example, a cause node is identified that is associated with an issue. Subsequently, a rule associated with the cause node may be evaluated in order to determine whether solution node associated with the cause node via an edge should be included in a set of potential solutions. In examples, nodes and edges of a knowledge graph are generated based on an analysis of user manuals, supplier documentation, technology websites (e.g., relating to network equipment, troubleshooting, etc.), knowledgebase articles and notices, support bulletins, trouble tickets, or any of a variety of other third-party sources, among other examples. For example, data may be collected from a technology website, associated with network equipment, and used to generate nodes and associated edges within a knowledge graph accordingly.

As another example, natural language processing (NLP) is used to generate a knowledge graph or add nodes and/or edges to an existing knowledge graph. For example, files, directories, and log data (e.g., from within a CDN, from a client device and/or an associated client application, etc.) may be processed according to NLP techniques in order to generate cause nodes, solution nodes, and associated edges within a knowledge graph. Other data sources include, but are not limited to, current event data (e.g., relating to weather conditions and natural disasters, construction events, news reports, police reports, data from dark web monitoring sites to identify activities of bad actors, etc.) and electronic messages (e.g., relating to development work and/or updates, changes, and outages that may impact CDN performance, such as in internal or external chat logs, from social networks, etc.). As another example, a planned maintenance database is processed to determine impacts on CDN performance resulting from maintenance. A network inventory system or information regarding network architecture may be processed to identify network capacity, server locations, and associated geographic locations for CDN devices, which may be correlated with data from other data sources. In some instances, trouble tickets comprising customer feedback and/or transcribed support calls are processed to identify incidents and associated effects on CDN performance.

Accordingly, data from such data sources is processed (e.g., in combination with multiple data sources, independent of other data sources, etc.) to identify historical, actual, and/or potential impacts to the CDN (e.g., physical effects on CDN devices, software issues, etc.), such that the knowledge graph may be used to identify issues and associated solutions as described herein. In some instances, an issue is identified that relates to a network that connects the CDN with a set of customers, while another issue is identified relating to the CDN itself. As a result of processing such issues with one or more knowledge graphs comprising data from a variety of sources, it may be determined that the issues are related and that they may be resolved by implementing at least a similar set of solutions.

A separate knowledge graph may be generated for each data source. For example, there may be a weather knowledge graph and a construction knowledge graph. In other examples, a knowledge graph may incorporate another knowledge graph by reference or multiple data sources may be processed to generate a single knowledge graph. Knowledge graphs may be stored in a repository. As an example, the repository may be centralized at a regional node of a CDN, such that edge nodes associated with the regional node may access the knowledge graph from the regional node accordingly. In other examples, an edge node of the CDN may generate a knowledge graph, which may subsequently be shared with the regional node. In some instances, a knowledge graph may reference another knowledge graph stored at another node of the CDN. Thus, it will be appreciated that any of a variety of storage and distribution techniques may be used for knowledge graphs according to aspects described herein.

A set of solutions generated by a solution generation engine may be processed by a solution implementation engine to automatically resolve the issue that was identified by the data processing engine. For example, each solution of the set of solutions may be iteratively implemented until it is determined that the issue is at least partially resolved. In some examples, a solution is selected from the set of solutions based on a historical success rate associated with the solution. For example, the historical success rate may be generated by a data processing engine based on log data associated implementing a solution to resolve a similar issue in the past or may be associated with the solution in a set of solutions generated by the solution generation engine, among other examples. It will be appreciated that any of a variety of techniques may be used to select a solution from a set of solutions for implementation.

In examples, a solution implementation engine accesses an inventory system that comprises a catalog of devices of the CDN and implements a solution based on the catalog accordingly. For example, the solution implementation engine may identify one or more devices of the CDN using the catalog and may implement the solution by altering the configuration of the devices and/or changing the structure of the CDN accordingly. For example, the solution implementation engine may reconfigure an identified device, may generate a ticket to replace the device, or may reconfigure a device associated with the identified device, among other examples. Thus, it will be appreciated that a solution implementation engine may perform actions associated with any of a variety of devices, rather than only a device that is directly associated with the identified issue.

In some examples, the solution implementation engine identifies solution implementation information, such as a specific set of instructions associated with a solution that was generated by the solution generation engine. Thus, the solution generation engine need not have specific knowledge of the underlying hardware, software, and/or structure of the CDN when generating such solutions. Rather, the solution implementation engine provides a layer of abstraction between a solution and associated implementation-specific details that are used to implement the solution. For example, similar to the solution generation engine, a solution implementation engine may be trained using any of a variety of sources, including, but not limited to, a manual, a knowledgebase article, a trouble ticket, or any of a variety of other third-party sources. In other examples, solution implementation information may be provided by one or more users and stored in a solution data store for subsequent access by the solution implementation engine.

In examples, a solution implementation engine may not be specialized (e.g., according to hardware, software, etc.), and may therefore be a "generic" solution implementation engine instead. For example, a generic solution implementation engine may implement solutions regardless of a type of hardware, software, vendor, computing functionality, or other specific aspects associated with implementing a solution. Thus, it will be appreciated that such a generic solution implementation engine may implement a solution for any of a variety of hardware devices, software, vendors, and/or computing-functionality, or any combination thereof. In some examples, multiple solution implementation engines are used. For example, a subset of the solutions may be implemented by a specialized solution implementation engine, while another subset of the solutions may be implemented by a generic solution implementation engine.

A dashboard may be presented with output generated from one or more data processing engines, solution generation engines, and/or solution implementation engines. For example, identified issues may be displayed alongside one or more generated solutions. Implementation status may be indicated for the displayed solutions, thereby providing a graphical representation of the current state of the identified issue and associated automatic actions that have performed to remedy the issue according to aspects described herein. In other examples, forecasts may be generated and displayed based on the modeling techniques described above or, as a further example, anomaly alerts (e.g., displayed in the dashboard, sent using an electronic message, etc.) may be generated when actual or forecasted data is identified as an issue.

FIG. 1A illustrates an overview of an example system 100 in which aspects of an AI-supported network are performed. As illustrated, system 100 comprises CDN node 102, CDN node 104, regional node 106, client device 108, and network 110. CDN node 102, CDN node 104, regional node 106, and client device 108 are illustrated communicating through network 110. Network 110 may comprise a local area network, a wide area network, one or more cellular networks, and/or the Internet, among other examples.

As described above, a service (not pictured) may use a CDN to provide computing functionality associated with any of a variety of services, including, but not limited to, a video streaming service, a video game service, a cloud-computing service, or a web application service, among other examples. An example CDN is illustrated by dashed box 140 and comprises CDN nodes 102 and 104 and regional node 106. It will be appreciated that, in other examples, certain elements of the example CDN described with respect to system 100 may be provided by a third party and/or functionality described herein with respect to specific elements may be distributed according to any of a variety of other techniques.

Client device 108 may be any of a variety of computing devices, including, but not limited to, a mobile computing device, a tablet computing device, a laptop computing device, or a desktop computing device. In examples, client device 108 communicates with one or more nodes of CDN 140. Client device 108 is illustrated as comprising application 134, which may be provided by a service and/or a CDN and may communicate with one or more nodes 102, 104, and/or 106 in order to access computing functionality provided by the CDN.

CDN node 102 is illustrated as comprising log processor 112 and node devices 114 and 116. Example node devices include, but are not limited to, edge servers, domain name system (DNS) servers, routers, switches, load balancers, and/or firewall devices. It will be appreciated that node devices 114 and 116 may be computing devices on which one or more virtual machines and/or containers execute. Such virtual machines and containers may provide similar functionality to hardware-based counterparts. Accordingly, node devices 114 and 116 provide computing functionality of the CDN according to aspects described herein.

CDN node 102 is illustrated as further comprising log processor 112. In examples, devices of CDN node 102 generate log data, such as node devices 114 and 116. Log processor 112 processes such log data based on one or more models as described herein, thereby generating model processing results. For example, log processor 112 may process the log data in order to generate a statistical model, which may then be used to evaluate subsequent log data. The statistical model may identify one or more thresholds or ranges that are indicative of normal or routine behavior for CDN node 102, such that subsequent log data that exceeds such a threshold or range is classified accordingly. As another example, log processor 112 uses a machine learning model (e.g., generated according to unsupervised or supervised techniques and/or iteratively refined using log data). In some examples, log processor 112 provides one or more models to regional node 106 and/or receives such models from regional node 106. In some examples, log processor 112 omits or otherwise filters out log data and/or model processing results that are associated with routine or expected behavior of CDN node 102, such that the entire set of such data is not retained and/or communicated to regional node 106.

Similar to CDN node 102, CDN node 104 is illustrated as comprising log processor 118 and node devices 120 and 122. Such aspects are similar to those described above with respect to CDN node 102 and are therefore not re-described in detail. In examples, a model generated by log processor 112 of CDN node 102 is provided to and subsequently used by log processor 118 of CDN node 104 via regional node 106. While CDN nodes 102 and 104 are each illustrated as comprising a two node devices (node devices 114 and 116, and node devices 120 and 122, respectively), it will be appreciated that any number of node devices may be used in a CDN node. Additionally, a node need not comprise a log processor. Rather, in other examples, a log processor of one node may process log data for one or more other nodes. As an example, log processor 118 may be omitted, such that log processor 112 of CDN node 102 is used to process log data from CDN node 104. CDN nodes 102 and 104 may be geographically distributed in order to improve latency between the nodes and client computing devices.

System 100 further comprises regional node 106. Regional node 106 is illustrated as comprising data processing engine 124, solution generation engine 126, solution implementation engine 128, and data store 130. In some examples, regional node 106 may further comprise elements similar to CDN nodes 102 and 104, such as one or more caches, edge servers, and/or log processors.

In examples, regional node 106 manages CDN nodes 102 and 104. For example, data processing engine 124 of regional node 106 aggregates and further processes model processing results and/or log data from CDN nodes 102 and 104 (e.g., from log processors 112 and 118, respectively). Thus, log data may be processed at CDN nodes 102 and 104 prior to aggregation at regional node 106, thereby reducing potential bandwidth constraints and processing bottlenecks at regional node 106. In other examples, log processor 112 and/or 118 may be omitted, such that log data is aggregated and processed at regional node 106. The aggregated log data and/or model processing results (e.g., as may be generated by log processor 112, log processor 118, and/or data processing engine 124) may be stored in data store 130.

As discussed above, model processing results received from CDN nodes 102 and 104 may comprise at least a subset of the log data associated with the model processing result. In another example, other information may be communicated in addition to or as an alternative to the subset of log data, including, but not limited to, an identifier associated with the CDN node and/or an identifier associated with a device in the CDN node, a model that was used to generate the model processing result, and/or a confidence score associated with the model processing result. Thus, it will be appreciated that data processing engine 124 may receive raw log data, model processing results, or any combination thereof, such that log processing according to models as described herein need not occur at a centralized location but, for example, may instead be performed at a CDN nodes 102 and 104, and/or regional node 106. In examples, an issue is identified at regional node, such as by data processing engine 124 of regional node 106. In other examples, an issue is identified by a log processor of a CDN node, such as log processor 112 or 118 of CDN nodes 102 and 104, respectively, after which an indication of the identified issue may be provided to regional node 106.

Regional node 106 is further illustrated as comprising solution generation engine 126. In examples, solution generation engine 126 processes an indication of an identified issue (e.g., as may be generated by data processing engine 124) to identify a cause and an associated set of solutions. As described above, solution generation engine 126 may be trained according to machine learning techniques based on any of a variety of training data, including, but not limited to, manual, knowledgebase articles, trouble tickets, and/or any of a variety of other third-party sources. In some examples, a knowledge graph is used, which may be stored in data store 130 of regional node 106. The knowledge graph may comprise cause nodes and solution nodes, each of which may be interrelated using edges. Thus, solution generation engine 126 may identify a cause node associated with an issue and evaluate relationships between the identified cause node and one or more solution nodes in order to generate a set of solutions for a given issue.

In some instances, solution generation engine 126 is a specialized solution generation engine, such that solution generation engine 126 is trained to generate solutions for a specific set of software packages and/or hardware devices. In another instance, solution generation engine 126 is a generic solution generation engine, such that solution generation engine 126 generates solutions for any of a variety of software packages, vendors, and/or hardware devices. In such instances, solution generation engine 126 may process issues in a way that is agnostic to certain aspects of an associated software package, vendor, and/or hardware device, as the causes and associated solutions generated by solution generation engine 126 may be applicable to the identified issue regardless of such idiosyncrasies.

Thus, while regional node 106 is illustrated as comprising one solution generation engine 126, multiple specialized and/or generic solution generation engines may be used in other examples. As discussed above, each solution generation engine may listen for an issue on which it is trained (e.g., via a message bus, a chat channel, etc.), such that one or more suited solution generation engines may process an issue identified by data processing engine 124. In other examples, data processing engine 124 may select a solution generation engine from a set of available solution generation engines and provide an issue indication to the selected solution generation engine.

Solution implementation engine 128 of regional node 106 implements solutions generated by solution generation engine 126 in order to resolve an issue identified by data processing engine 124. In examples, solution implementation engine 128 receives a set of solutions from solution generation engine 126. In instances where multiple solution generation engines comprise regional node 106, it will be appreciated that solution implementation engine 128 may receive multiple sets of solutions from multiple solution generation engines. Solution implementation engine 128 may iterate through each solution of a set of solutions in order to automatically address the identified issue. As another example, solution implementation engine 128 ranks a set of solutions and selects a solution based on a historical or estimated success rate associated with the solution. In an example, solution generation engine 126 may provide an indication as to a historical or estimated success rate associated with a solution. It will be appreciated that any of a variety of techniques may be used to rank a set of solutions and/or select a solution for implementation.

A feedback loop may exist, wherein log data and/or a model processing result associated with a solution that is implemented by solution implementation engine 128 is received by data processing engine 124. Solution generation engine 126 may process the received information and determine whether a solution implemented by solution implementation engine 128 had an effect on the issue that was originally identified. Such an evaluation may be performed while solution implementation engine 128 is implementing a solution or after implementation has occurred, among other examples. If a solution is determined to have resolved the identified issue, an indication may be provided to solution implementation engine 128 that the solution was successful, thereby causing solution implementation engine 128 to stop implementing solutions from the set of solutions that was generated by solution generation engine 126. In other examples, solution generation engine 126 may identify one or more additional or alternative solutions (e.g., as a result of evaluating rules in a knowledge graph), which may be provided to solution implementation engine 128, thereby updating the set of solutions that is available for implementation by solution implementation engine 128.

While system 100 is described as comprising two CDN nodes 102 and 104, and one regional node 106, it will be appreciated that any of a variety of other configurations may be used. For example, multiple regional nodes may be used, where each regional node manages a set of CDN nodes. As another example, a hierarchy need not have two levels, but may instead have fewer or additional levels. In some examples, a hierarchy may not be used. Similarly, functionality described with respect to CDN nodes 102 and 104, and regional node 106 may be distributed among nodes within a CDN according to any of a variety of other configurations.

FIG. 1B illustrates an overview of an example data processing engine 140. In examples, data processing engine 140 may be a data processing engine of a node of a CDN, such as data processing engine 124 of regional node 106 in FIG. 1A. As illustrated, data processing engine 140 comprises data collector 142, model manager 144, and model processor 146. Data processing engine 140 may receive and process log data and/or model processing results from nodes of a CDN, such as CDN nodes 102 and 104 in FIG. 1A. In examples, data collector 142 receives such log data and/or model processing results, as may be received from a log processor such as log processor 112 or 118 in FIG. 1A. The received log data and/or model processing results may be stored in a data store, such as data store 130 in FIG. 1A.

Data processing engine 140 is further illustrated as comprising model manager 144. In examples, model manager 144 generates, provides, and/or receives models from one or more nodes of a CDN, as may have been used by log processors associated therewith (e.g., log processor 112 or 118 of CDN nodes 102 and 104, respectively, in FIG. 1A). For example, models processed by model manager 144 may have been generated according to statistical or machine learning techniques as described herein, among other examples. Models received by model manager 144 may be stored by a data store. In examples, model manager 144 evaluates a set of models according to any of a variety of model performance metrics, including, but not limited to, prediction accuracy or average confidence score. In some instances, model manager 144 determines a set of models based on models from nodes having similar attributes. For example, nodes having a similar geographic location, similar computing functionality, and/or that provide computing functionality for the same service or similar services.

In some instances, model manager 144 tracks model performance over time, thereby enabling multiple models to be ranked according to one or more model performance metrics (e.g., prediction accuracy, average confidence score, etc.). Further, a model may be associated with specific hardware, software, a vendor, a service, computing functionality of the CDN, or other instances in which the model should be used to process log data. Thus, the model need not be used to process log data in all instances, but may instead by associated with one or more specific instances in which the model is well-suited to process such log data.

Model processor 146 processes log data and/or model processing results collected by data collector 142 using a model from model manager 144 to identify an issue accordingly. As another example, model processor 146 may apply a model to generate a forecast using information that is received by data collector 142. A forecast may be evaluated to identify an issue, for example according to a predetermined threshold or a predetermined range. Example issues include, but are not limited to, a performance bottleneck, a hardware or software failure, or a hardware or software misconfiguration, among other examples.

FIG. 1C illustrates an overview of an example solution generation engine 160. In examples, solution generation engine 160 may be a solution generation engine of a node of a CDN, such as solution generation engine 126 of regional node 106 in FIG. 1A. As discussed herein, solution generation engine 160 may be a generic solution generation engine or a specialized solution generation engine.

As illustrated, solution generation engine 160 comprises rule generator 162, rule processing engine 164, and knowledge graph 166. In examples, rule generator 162 processes training data to generate cause nodes, solution nodes, and relationships within knowledge graph 166. A relationship between a cause node and a solution node in knowledge graph 166 may have one or more rules that are usable to determine whether the associated solution node is applicable to an identified issue. Training data may come from any of a variety of sources, including, but not limited to, a manual, a knowledgebase article, a trouble ticket, or any of a variety of other data sources according to aspects described herein. For example, if solution generation engine 160 is a specialized solution generation engine, the training data used by rule generation 162 to generate knowledge graph 166 may be associated with one or more specific software packages and/or hardware devices, among other examples. In examples, knowledge graph 166 is stored in a data store of a CDN node, such as data store 130 of regional node 106 in FIG. 1A.

Rule processing engine 164 evaluates an issue (e.g., as may be received from a data processing engine, such as data processing engine 124 in FIG. 1A or data processing engine 140 in FIG. 1B) using knowledge graph 166. For example, rule processing engine 164 determines a cause node within knowledge graph 166 that is associated with the issue. The determination may comprise evaluating a type of issue, one or more characteristics of the device and/or software package associated with the issue (e.g., node device 114, 116, 120, or 122 in FIG. 1A), and/or log data associated with the issue, among other examples. As an example, a query within knowledge graph 166 may identify a cause node matching a property and/or an associated value. Accordingly, rule processing engine 164 evaluates relationships between the identified cause node and one or more solution nodes within knowledge graph 166. In examples, each relationship has one or more rules that are used by rule processing engine 164 to determine whether a given solution node is a potential solution to the identified issue. Rule processing engine 164 processes the rules and generates a set of solutions based on solution nodes associated with rules that are satisfied by the identified issue.

While example techniques are described herein using a knowledge graph having a specific structure, it will be appreciated that any of a variety of other techniques and data structures may be used for processing an issue and generating a set of solutions.

FIG. 1D illustrates an overview of an example solution implementation engine 180. In examples, solution implementation engine 180 may be a solution implementation engine of a CDN node, such as solution implementation engine 128 of regional node 106 in FIG. 1A. Similar to a solution generation engine, solution implementation engine 180 may be a generic solution implementation engine or may be a specialized solution implementation engine according to aspects described herein.

As illustrated, solution implementation engine 180 comprises orchestration engine 182, robotic process automator 184, status monitor 186, and solution data store 188. In examples, solution implementation engine 180 receives a set of solutions from a solution generation engine, such as solution generation engine 126 in FIG. 1A or solution generation engine 160 in FIG. 1C. Solution data store 188 stores solution implementation information, thereby enabling solution implementation engine 180 to implement a solution that is generated by a solution generation engine. Example solution implementation information comprises a mapping between a general solution (e.g., as may be generated by a solution generation engine) and a set of actions to perform in order to achieve the general solution. Thus, the solution generation engine need not be configured to address implementation-specific aspects of the CDN, and may instead operate at a level of abstraction above such specificity. As a result, the solution generation engine is able to generate solutions for a wide variety of hardware and/or software scenarios without regard for implementation details.

Solution implementation engine 180 is further illustrated as comprising orchestration engine 182 and robotic process automator 184, either or both of which may be used to implement a solution according to solution implementation information stored in solution data store 188. For example, orchestration engine 182 may configure aspects of a CDN node (e.g., CDN nodes 102 and 104 or regional node 106 in FIG. 1A) or devices therein based on solution implementation information in order to resolve an identified issue. In examples, orchestration engine 182 adds or removes node devices, log processors, or other components of a CDN node. As another example, orchestration engine 182 may power on, instantiate, reconfigure, or power off a virtual machine. Robotic process automator 184 may configure a software package or hardware device using an API, by executing commands over a secure shell (SSH) session, or via Intelligent Platform Management Interface (IPMI) commands, among other examples.

Solution implementation engine 180 is further illustrated as comprising status monitor 186. In examples, status monitor 186 monitors implementation progress of a solution, for example to determine whether the solution is effective, to generate an estimated time of completion, or to determine whether to start implementing another solution instead. In some instances, status monitor 186 generates a report or dashboard that indicates an identified issue (e.g., as may be identified by a data processing issue), a cause and/or a set of solutions (e.g., as may be generated by a solution generation engine), as well as information about solution implementation (e.g., which solution is currently being implemented, an indication of implementation progress, etc.).

Figure 2:
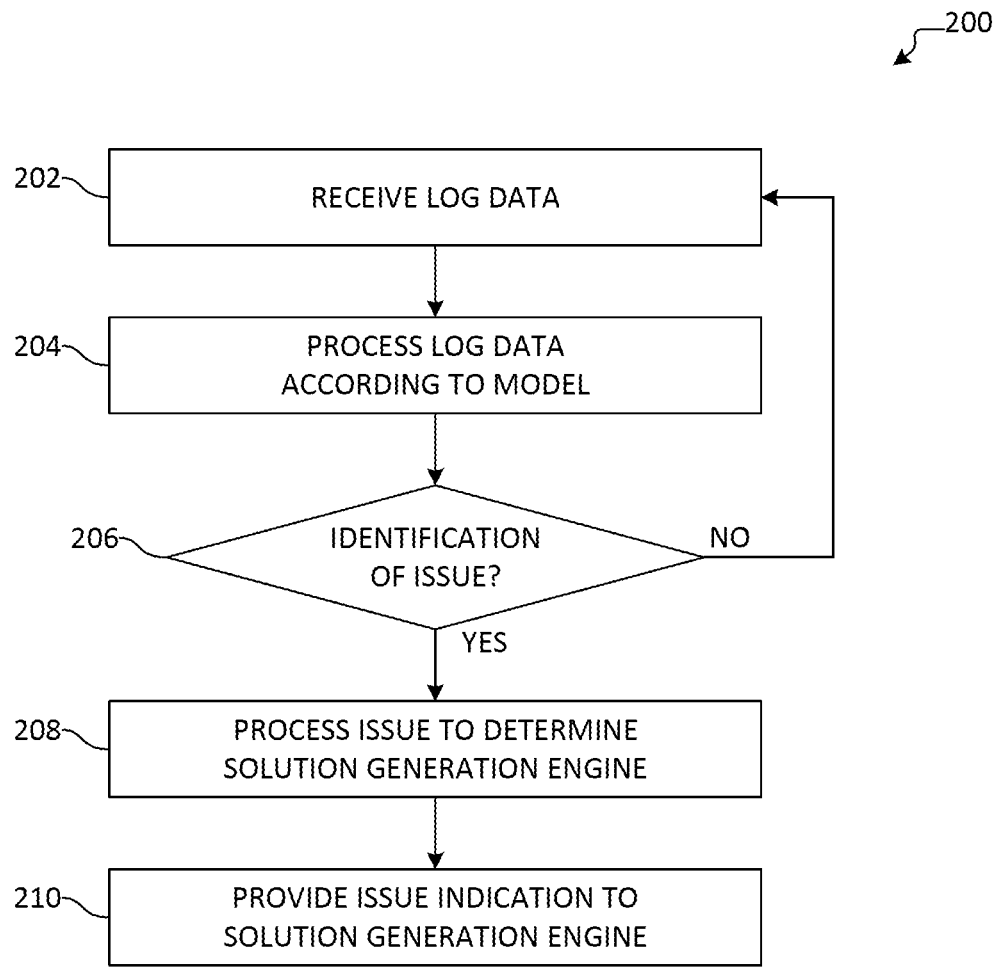
FIG. 2 illustrates an overview of an example method for processing log data to identify a failure based on a model.

FIG. 2 illustrates an overview of an example method 200 for processing log data to identify a failure based on a model. In examples, aspects of method 200 are performed by a data processing engine, such as data processing engine 124 in FIG. 1A or data processing engine 140 in FIG. 1B. Method 200 begins at operation 202, where log data is received. In examples, log data is received by a data collector, such as data collector 142 in FIG. 1B. Log data may be received from a node of a CDN (e.g., node 102, 104, or 106 in FIG. 1A) and may be processed by a log processor (e.g., log processor 112 or 118) and/or may be raw log data.

Flow progresses to operation 204, where the received log data is processed according to a model. Any of a variety of models may be used, including, but not limited to, a machine learning model or a statistical model. The model applied at operation 204 may be provided by a model manager, such as model manager 144 in FIG. 1B. In some examples, multiple models are used at operation 204 to process the log data. For example, results from a set of models are compared to identify which model has the highest confidence. Processing at operation 204 may comprise processing the received log data using the model or, in other examples, the received log data may be used to generate a forecast that is processed as an alternate or in addition to the received log data.

At determination 206, it is determined whether an issue is identified. Example issues include, but are not limited to, a performance bottleneck, a hardware or software failure, or a hardware or software misconfiguration, among other examples. In instances where a statistical model is used, the determination may comprise using one or more thresholds or ranges that are indicative of normal or routine behavior, such that log data that exceeds such a threshold or range is classified as an issue. In other instances, a classification from a machine learning model is evaluated to determine the classification indicates that an issue is present. While example issue identification techniques are described herein, it will be appreciated that any of a variety of techniques may be used in addition to or as an alternative to the techniques described herein. For example, a set of rules or branching logic may be used.

If it is determined that an issue is not identified, flow branches "NO" to operation 202, where log data is received and processed as described above. However, if it is instead determined that an issue is identified based on the received log data, flow branches "YES" to operation 208, where the identified issue is processed to determine a solution generation engine. In examples, operation 208 comprises identifying a hardware device and/or software package with which the issue is associated, such that a solution generation engine relating to the hardware device and/or software package is determined accordingly. In other examples, computing functionality associated with the identified issue is evaluated to determine a solution generation engine that is associated with the computing functionality accordingly. The determined solution generation engine may be a generic or specialized solution generation engine. In some examples, multiple solution generation engines are determined or, in other examples, a single solution generation engine is selected out of a set of solution generation engines (e.g., for load balancing, based on a solution generation engine having the highest likelihood of success, etc.). In some instances, operation 208 is omitted, as may be the case when solution generation engines listen on a message bus, chat channel, or other communication mechanism by which an issue indication may be received accordingly. Thus, rather than directing an issue indication to a specific solution generation engine with which to process an issue, the solution generation engine may instead listen for issues that it is suited to handle.

Flow progresses to operation 210, where an issue indication is provided to the determined solution generation engine. In examples, the issue indication comprises at least a part of the log data that was received at operation 202 and/or at least a part of a model processing result generated at operation 204. In examples where operation 208 is omitted, the issue indication may comprise identifying information that is usable by a solution generation engine to determine that it is suited to handle the issue. For example, the identifying information may comprise an issue type and/or characteristics of a hardware device or software package associated with the issue. Method 200 terminates at operation 210.

Figure 3:
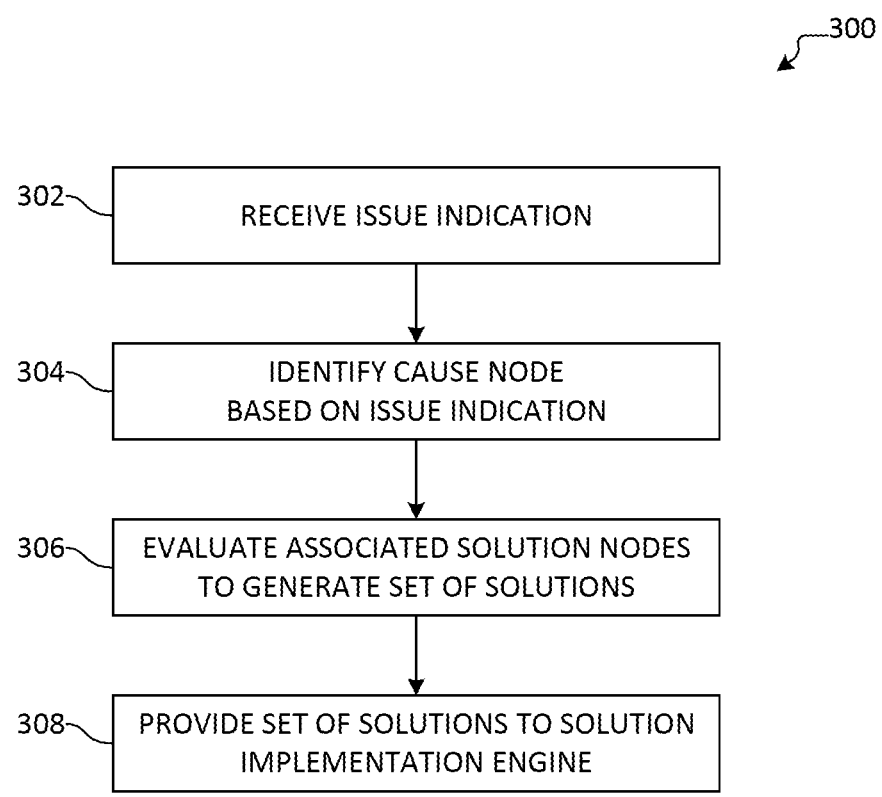
FIG. 3 illustrates an overview of an example method for processing a failure indication to generate a set of associated solutions.

FIG. 3 illustrates an overview of an example method 300 for processing a failure indication to generate a set of associated solutions. In examples, aspects of method 300 are performed by a solution generation engine, such as solution generation engine 126 in FIG. 1A or solution generation engine 160 in FIG. 1C. Method 300 begins at operation 302, where an issue indication is received. In examples, the issue indication is received from a data processing engine performing aspects of method 200 described above with respect to FIG. 2.

At operation 304, a cause node associated with the received issue indication is identified. The cause node may be in a knowledge graph, such as knowledge graph 166 in FIG. 1C. Identifying the cause node may comprise generating a query in the knowledge graph based on a type of issue, one or more characteristics of a device and/or software package associated with the issue (e.g., node device 114, 116, 120, or 122 in FIG. 1A), and/or log data associated with the issue, among other examples. As an example, the query may identify a cause node that matches a property and/or an associated value. For example, an exact or inexact match may be used. While method 300 is described in an example where a single cause node is identified at operation 304, it will be appreciated that similar techniques may be used when multiple cause nodes are identified.

Moving to operation 306, solution nodes associated with the cause node are evaluated to generate a set of solutions. In examples, aspects of operation 306 are performed by a rule processing engine, such as rule processing engine 164 in FIG. 1C. One or more relationships between the identified cause node and one or more solution nodes within the knowledge graph are evaluated. In examples, each relationship has one or more rules that are used to determine whether a given solution node is a potential solution to the identified issue. For example, the issue indication received at operation 302 may be evaluated to determine whether a given solution node associated with a cause node is an applicable solution. In examples, evaluating a rule may yield a binary determination or may yield a score, such that a score above a predetermined threshold is determined to indicate that the solution may resolve the issue. In some examples, operation 306 may comprise generating an estimated success metric based on historical data for resolution of similar issues and/or based on information that was received as part of the issue indication at operation 302. It will be appreciated that any of a variety of other metrics may be generated for identified solutions, such as an estimated business impact or an estimated monetary cost associated with implementing a solution.

At operation 308, the set of solutions generated at operation 308 is provided to a solution implementation engine. In examples, operation 308 comprises determining a solution implementation engine to which to provide the set of solutions. Thus, similar to aspects described herein relating to generic and specialized solution generation engines, it will be appreciated that a solution implementation engine may be generic or specialized. In other examples, the set of solutions are communicated using a message bus, a chat channel, or other communication technique. The set of solutions may be communicated with at least a part of the information that was included in the issue indication, thereby enabling the solution implementation engine to address the identified issue. Flow terminates at operation 308.

Figure 4:
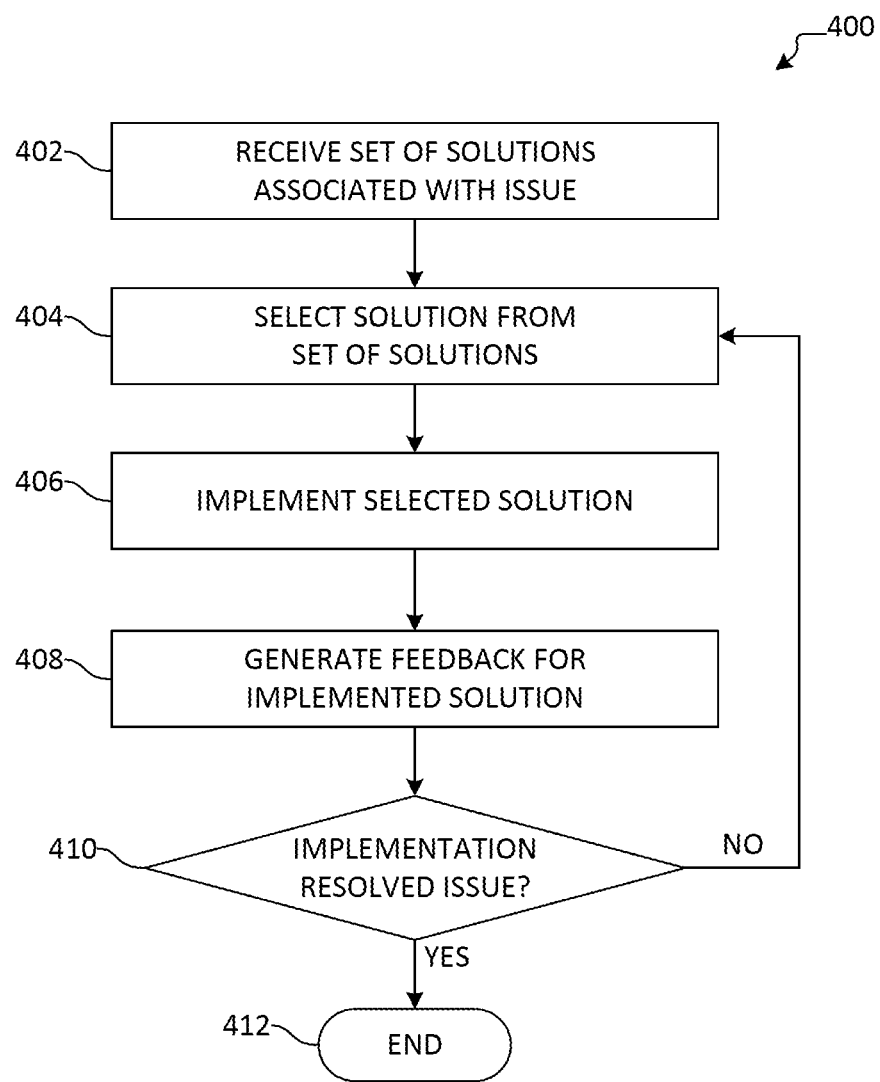
FIG. 4 illustrates an overview of an example method for processing a set of solutions to resolve an identified failure.

FIG. 4 illustrates an overview of an example method 400 for processing a set of solutions to resolve an identified failure. In examples, aspects of method 400 are performed by a solution implementation engine, such as solution implementation engine 128 in FIG. 1A or solution implementation engine 180 in FIG. 1D. Method 400 begins at operation 402, where a set of solutions is received. In examples, the set of solutions is received from a solution generation engine performing aspects of method 300 discussed above with respect to FIG. 3. In some instances, the set of solutions is received with information relating to an issue indication, such as a hardware device and/or software package that is experiencing an identified issue. As another example, each solution in the set of solutions may have an associated score or the set of solutions may be ranked according to which solution is most likely to resolve the identified issue or which solution is likely to result in the least amount of downtime, among other examples.

Flow progresses to operation 404, where a solution is selected from the set of solutions. In some examples, the first solution is selected, such that solutions may be implemented using the order in which they were received. In other examples, operation 404 may comprise ranking the received set of solutions according to any of a variety of metrics, including, but not limited to, estimated likelihood of success, historical success, estimated business impact, and/or estimated monetary cost, among other examples. While example ranking and selection techniques are described, it will be appreciated that any of a variety of other techniques may be used in other examples.

At operation 406, the selected solution is implemented. In examples, implementing the solution comprises identifying solution implementation information from a solution data store, such as solution data store 188 in FIG. 1D. In examples, operation 406 comprises configuring aspects of the CDN, as may be performed using an orchestration engine such as orchestration engine 182 in FIG. 1D. As another example, a robotic process automator (e.g., robotic process automator 184 in FIG. 1D) may be used to configure a software package and/or hardware device according to the solution implementation information. Thus, while operation 406 is illustrated as a single operation, it will be appreciated that operation 406 may comprise performing a series of operations to implement the selected solution, using an orchestration engine, a robotic process automator, or any of a variety of other components.

Moving to operation 408, feedback is generated for the implemented solution. As an example, a status monitor such as status monitor 186 in FIG. 1D may evaluate the effectiveness of the implemented solution, for example to determine whether the solution effectively resolved the issue and/or whether the solution was implemented successfully. In examples, the generated feedback may be communicated to a data processing engine and/or a solution generation, for example via a message bus or a chat channel. In other examples, operation 408 may be omitted and solution effectiveness may instead be determined by a data processing engine according to the feedback loop aspects described herein, wherein the existence (or lack thereof) of log data relating to the issue is identified.

At determination 410, it is determined whether the solution implemented at operation 406 resolved the issue. In examples, the determination comprises evaluating feedback that was generated at operation 408 and/or evaluating an indication from a data processing engine, such as data processing engine 124 in FIG. 1A or data processing engine 140 in FIG. 1B. If it is determined that the implemented solution did not resolve the issue, flow branches "NO" and returns to operation 404, where another solution is selected from the set of solutions. Thus, flow may iterate between operations 404, 406, 408, and 410, thereby implementing various solutions generated by a solution generation engine in order to attempt to automatically resolve the identified issue. Eventually, it may be determined at operation 410 that the issue has been resolved or, as another example, that there are no remaining solutions for implementation. In instances where there are no remaining solutions, an indication may be provided to a solution generation engine to request additional solutions. Thus, it will be appreciated that a set of all available solutions may not be received at operation 402 and that, rather, a subset may be received or a subsequent set may be refined according to which solutions have already been attempted without resolving the identified issue. Accordingly, flow branches "YES" and method 400 ends at operation 412.

Figure 5:
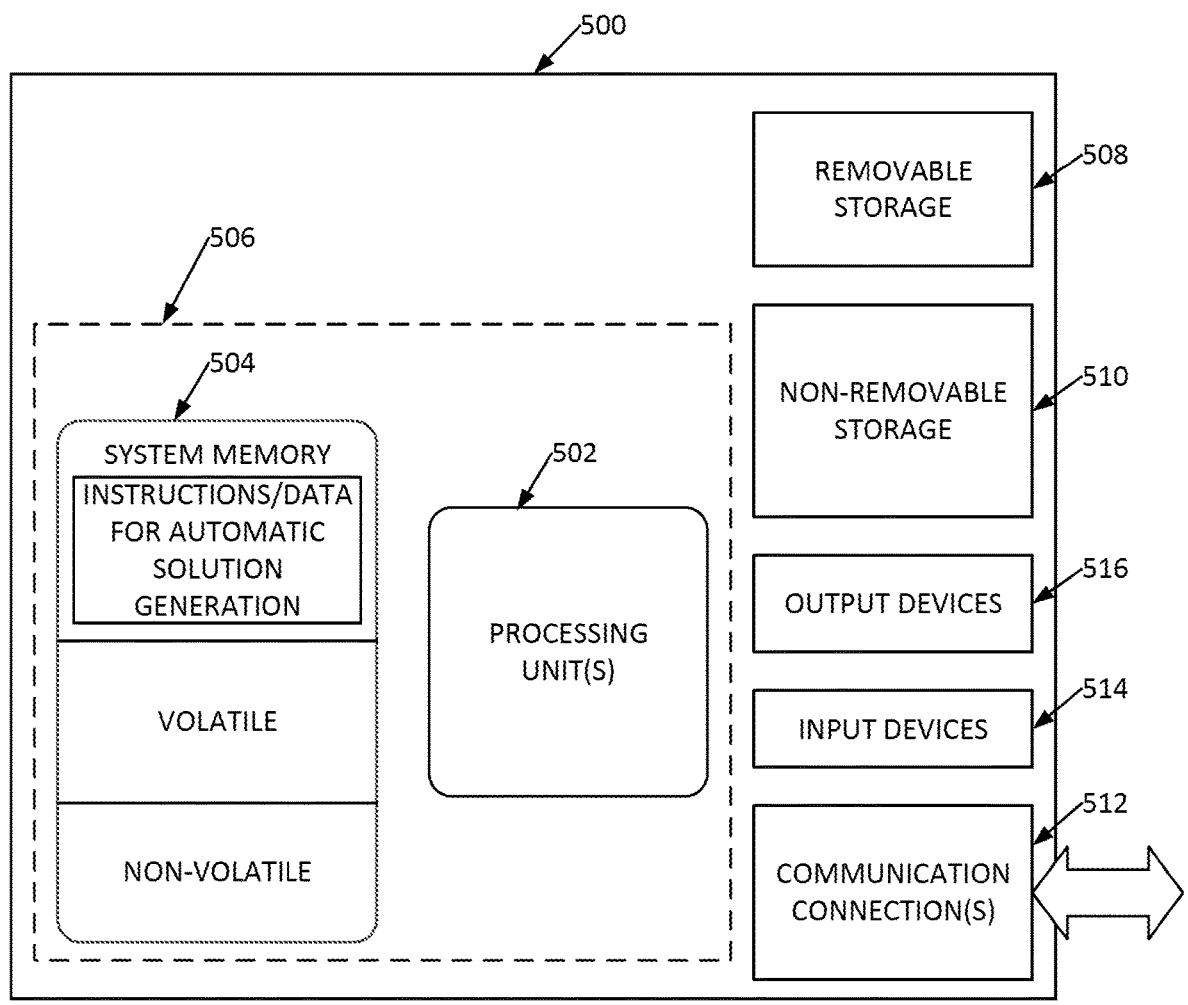
FIG. 5 illustrates an example of a suitable operating environment in which one or more of the present embodiments may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIGS. 2, 3, and 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A system comprising:
   at least one processor; and
   memory, operatively connected to the at least one processor and storing instructions that, when executed by the at least one processor, cause the system to perform a set of operations, the set of operations comprising:
   receiving, from a node of a content distribution network (CDN), log data comprising one or more events associated with a computing device of the node;
   processing the log data using a model to determine an issue;
   selecting a solution generation engine from a plurality of solution generation engines based at least in part on the determined issue;
   generating, by the selected solution generating engine and based on the determined issue, a set of solutions to resolve the issue, wherein generating the set of solutions comprises
      evaluating a knowledge graph based at least in part on the determined issue to identify a cause node;
      evaluating a rule of a relationship to determine whether the determined issue satisfies the rule, wherein the relationship associates a solution node with the cause node; and
      based on determining the determined issue satisfies the rule, adding a solution associated with the solution node to the set of solutions;
   selecting a first solution of the set of solutions; and
   implementing the first solution to resolve the issue.

2. The system of claim 1, wherein implementing the first solution to resolve the issue comprises:
   identifying a set of instructions associated with the first solution; and
   performing the identified set of instructions to implement the first solution.

3. The system of claim 1, wherein the solution generation engine is selected based at least in part on the computing device.

4. The system of claim 1, wherein the set of operations further comprises:
   storing at least a part of the log data associated with the determined issue as training data; and
   training an updated model using the training data.

5. The system of claim 4, wherein the training data further comprises at least a part of the log data associated with a routine operation of the computing device.

6. The system of claim 1, wherein the set of operations further comprises:
   determining the first solution did not resolve the issue;
   selecting a second solution of the set of solutions; and
   implementing the second solution to resolve the issue.

7. The system of claim 1, wherein processing the log data comprises:
   identifying at least a part of the log data associated with routine operation of the computing device to generate filtered log data; and
   processing the filtered log data using the model to determine the issue.

8. The system of claim 1, wherein the model is a first model and the issue is a first issue, and wherein processing the log data to determine the issue further comprises:
   processing the log data using a second model to identify a second issue; and
   selecting the first issue as the determined issue based at least in part on determining a performance metric for with the first model is higher than the performance metric for the second model.

9. The system of claim 8, wherein the performance metric is one of:
   a confidence score associated with processing the log data;
   an average confidence score based on historical model performance; or
   a prediction accuracy.

10. The system of claim 1, wherein the knowledge graph is generated from at least one of:
    a manual;
    a knowledge base article;
    a trouble ticket;
    current event data;
    an electronic message;
    a planned maintenance data base; or
    a network inventory system.

11. The system of claim 1, wherein the set of operations further comprises:
    determining that a performance metric of the model is below a predetermined threshold;
    based on determining that the performance metric is below the predetermined threshold, retraining the model using historical log data, wherein the historical log data comprises at least a part of the received log data; and
    processing additional log data using the retrained model to determine a second issue.

12. The system of claim 1, wherein the model is a first model and the set of operations further comprises:
    determining that a performance metric of the first model is below a predetermined threshold;

based on determining that the performance metric is below the predetermined threshold, selecting a second model to use in place of the first model; and processing additional log data using the second model to determine a second issue.

13. The system of claim 1, wherein selecting the solution generation engine further comprises identifying a hardware device or software package associated with the issue and selecting the solution generation based on the identified hardware device or software package.

14. The system of claim 1, wherein selecting the solution generation engine further comprises evaluating a computing functionality associated with the issue and selecting the solution generation engine based on the evaluated computing functionality.

15. A method comprising:

receiving, from a node of a content distribution network (CDN), log data comprising one or more events associated with a computing device of the node;

processing the log data using a model to determine an issue;

selecting a solution generation engine from a plurality of solution generation engines based at least in part on the determined issue;

generating, by the selected solution generation engine and based on the determined issue, a set of solutions to resolve the issue, wherein generating the set of solutions comprises evaluating a knowledge graph based at least in part on the determined issue to identify a cause node;

evaluating a rule of a relationship to determine whether the determined issue satisfies the rule, wherein the relationship associates a solution node with the cause node; and based on determining the determined issue satisfies the rule, adding a solution associated with the solution node to the set of solutions;

selecting a first solution of the set of solutions; and implementing the first solution to resolve the issue.

16. The method of claim 15, wherein implementing the first solution to resolve the issue comprises:

identifying a set of instructions associated with the first solution; and performing the identified set of instructions to implement the first solution.

17. The method of claim 15, further comprising:

storing at least a part of the log data associated with the determined issue as training data; and training an updated model using the training data.

18. The method of claim 17, wherein the training data further comprises at least a part of the log data associated with a routine operation of the computing device.

19. The method of claim 15, wherein processing the log data comprises:

identifying at least a part of the log data associated with routine operation of the computing device to generate filtered log data; and processing the filtered log data using the model to determine the issue.

* * * * *